Figure 11:
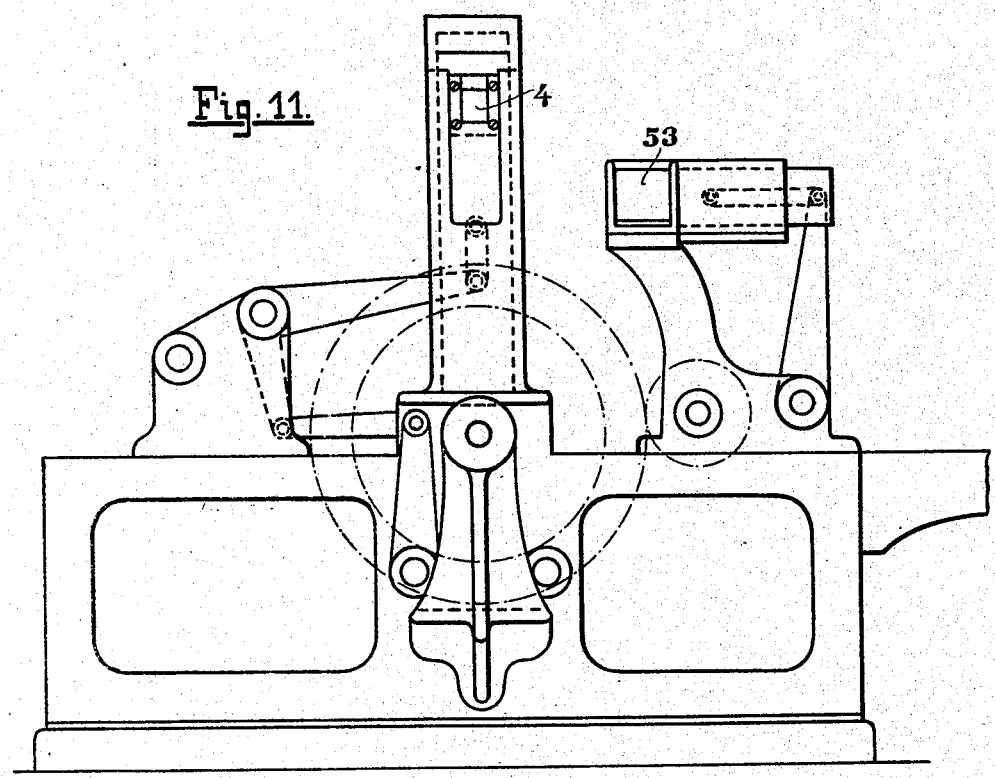

D. NYLANDER & R. HÖGFELDT.
PAPER OR LIKE BOX MACHINE.
APPLICATION FILED OCT. 7, 1915.

1,166,778.

Patented Jan. 4, 1916.
8 SHEETS—SHEET 1.

INVENTORS:
David Nylander
Richard Högfeldt
By Mr Wallace White
ATTY.

D. NYLANDER & R. HÖGFELDT.
PAPER OR LIKE BOX MACHINE.
APPLICATION FILED OCT. 7, 1915.
1,166,778.
Patented Jan. 4, 1916.
8 SHEETS—SHEET 2.
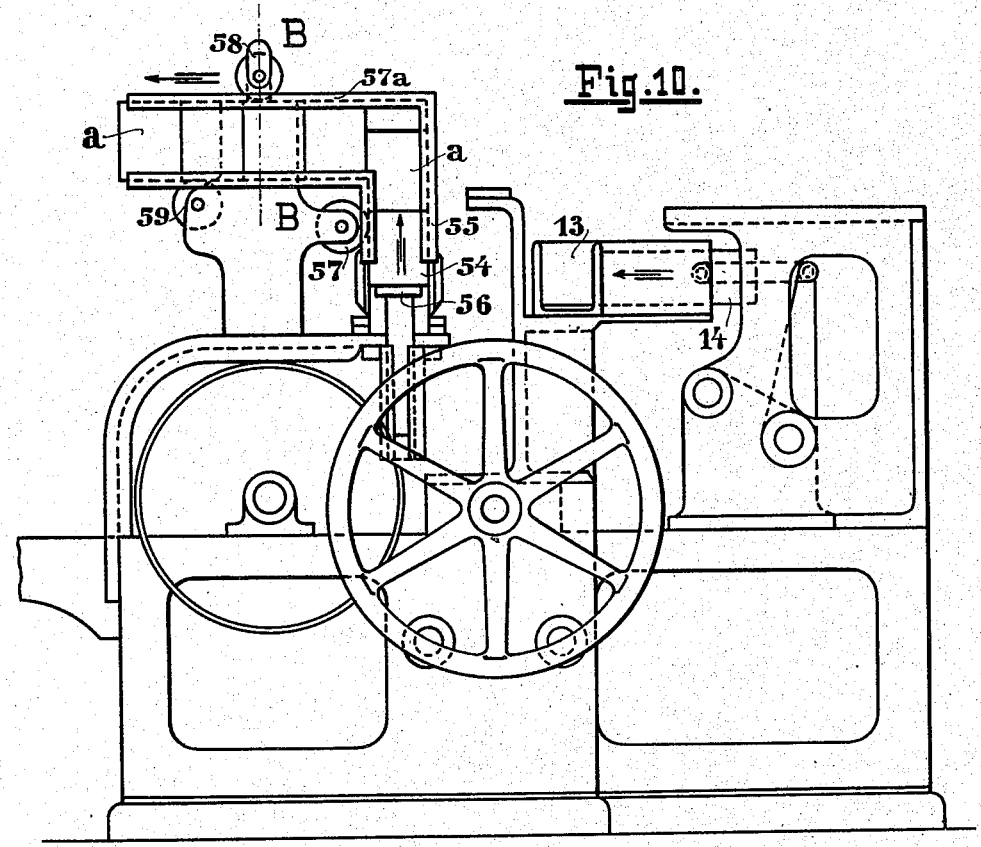
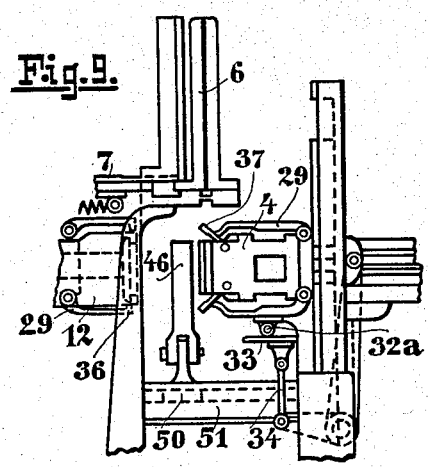
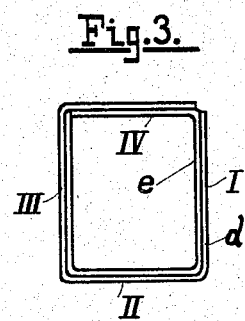
INVENTORS:
David Nylander
Richard Högfeldt
By Wm Wallace White
ATT'Y.

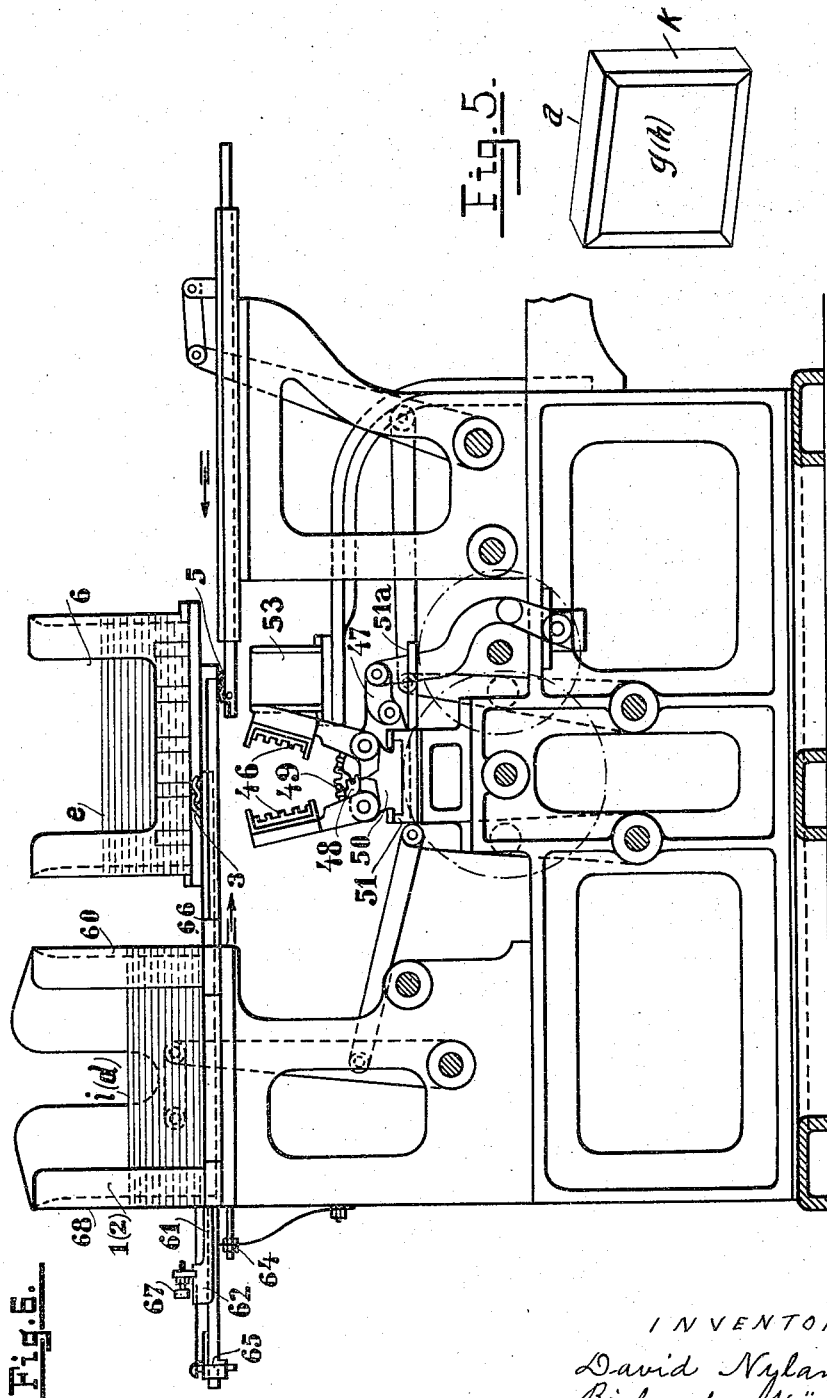

D. NYLANDER & R. HÖGFELDT.
PAPER OR LIKE BOX MACHINE.
APPLICATION FILED OCT. 7, 1915.
1,166,778.
Patented Jan. 4, 1916.
8 SHEETS—SHEET 4.
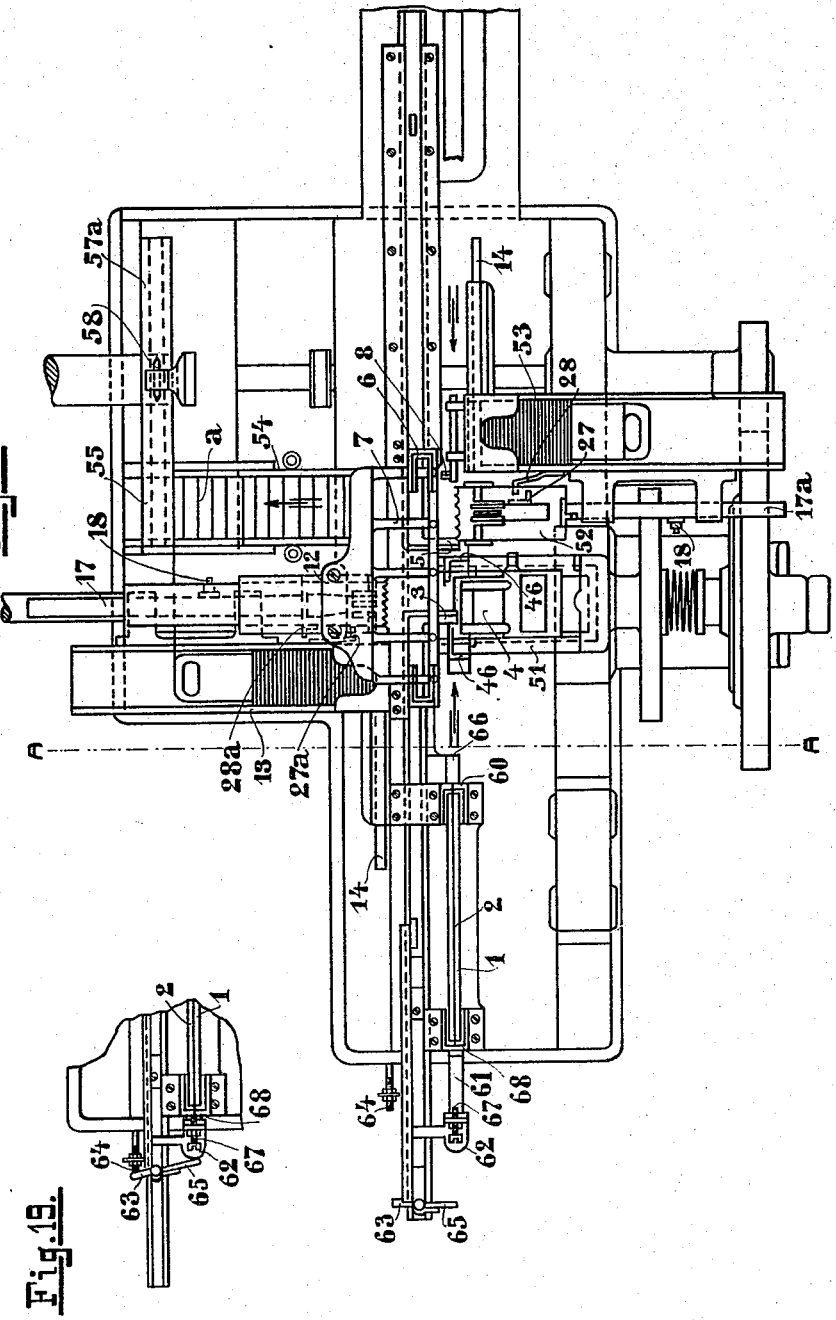
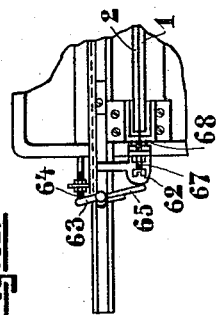
INVENTORS:
David Nylander
Richard Högfeldt
BY
Mr Wallace White
ATT'Y.

D. NYLANDER & R. HÖGFELDT.
PAPER OR LIKE BOX MACHINE.
APPLICATION FILED OCT. 7, 1915.
1,166,778.
Patented Jan. 4, 1916.
8 SHEETS—SHEET 5.
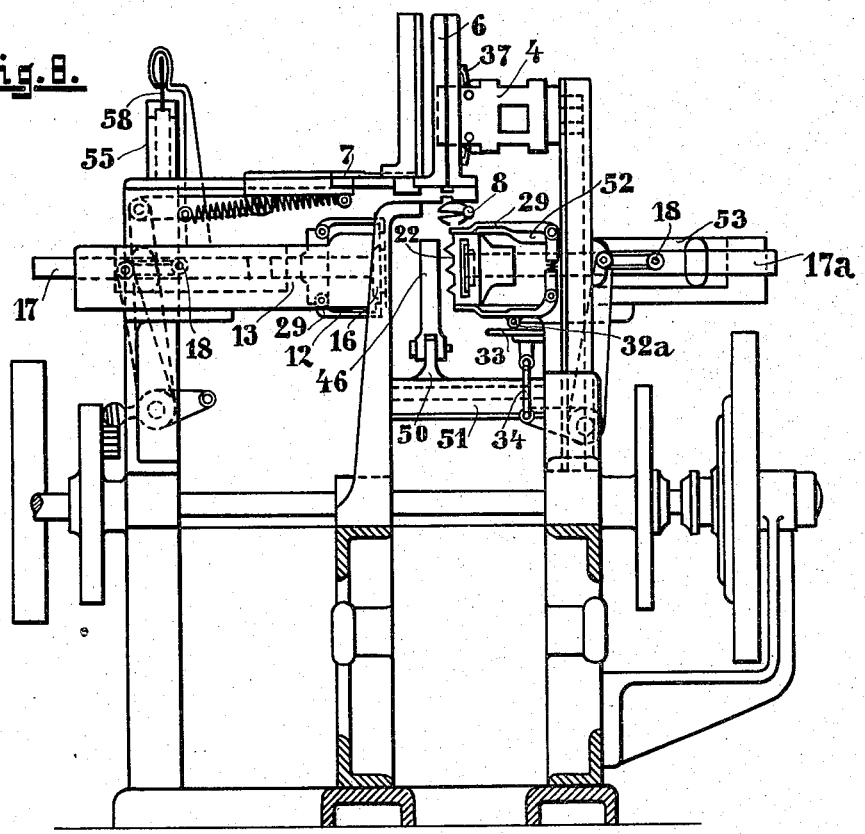
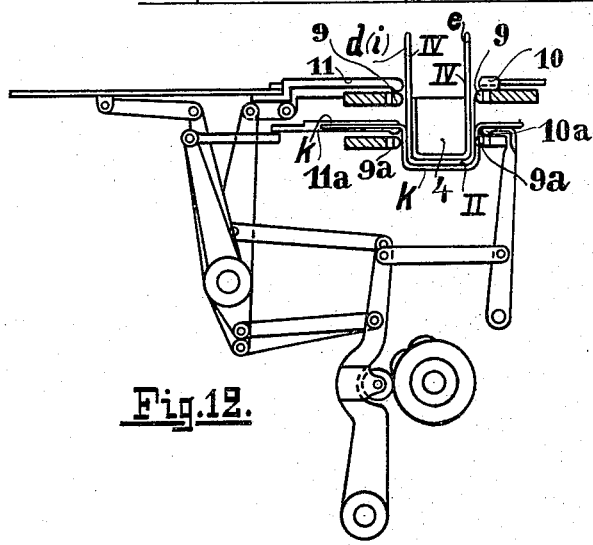
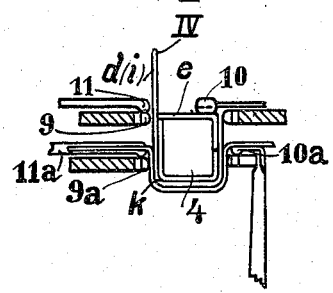

D. NYLANDER & R. HÖGFELDT.
PAPER OR LIKE BOX MACHINE.
APPLICATION FILED OCT. 7, 1915.
1,166,778.
Patented Jan. 4, 1916.
8 SHEETS—SHEET 6.
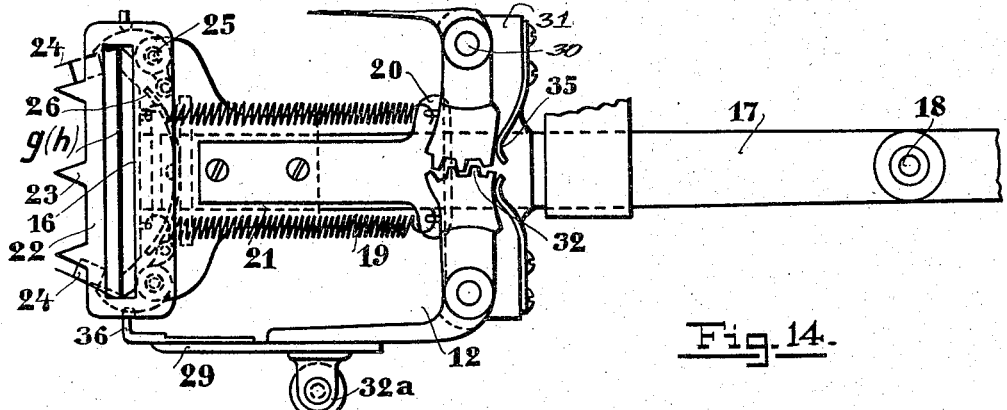
Fig. 14.
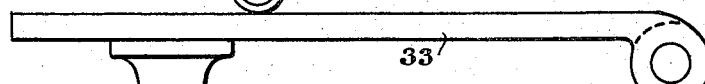
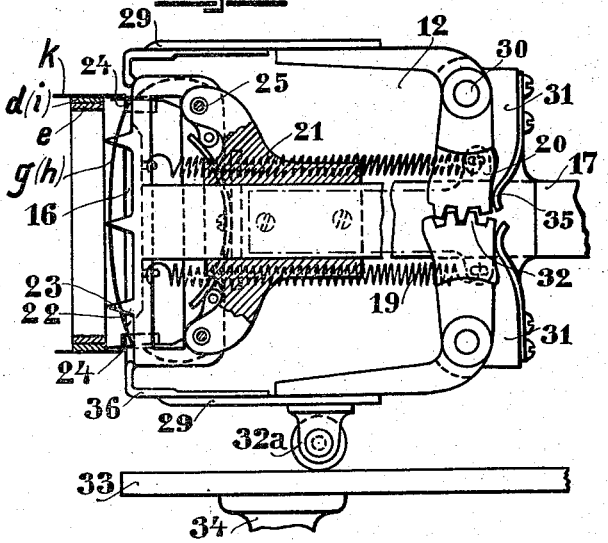
Fig. 16.
Fig. 18.
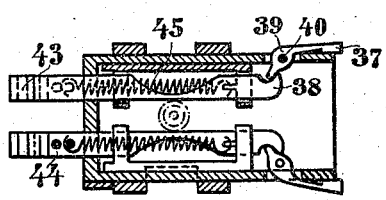
INVENTORS:
David Nylander
Richard Högfeldt
BY Mr. Wallace White
ATTY.

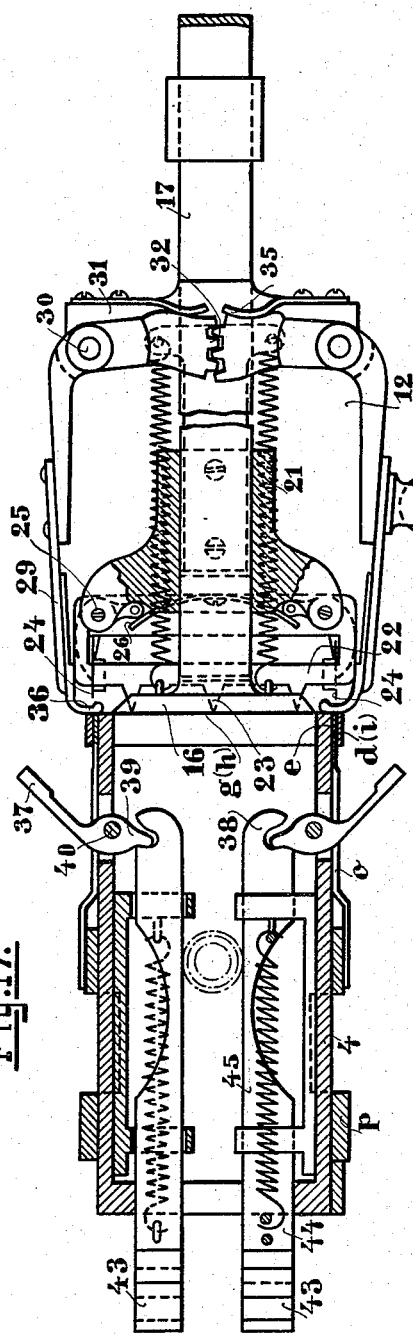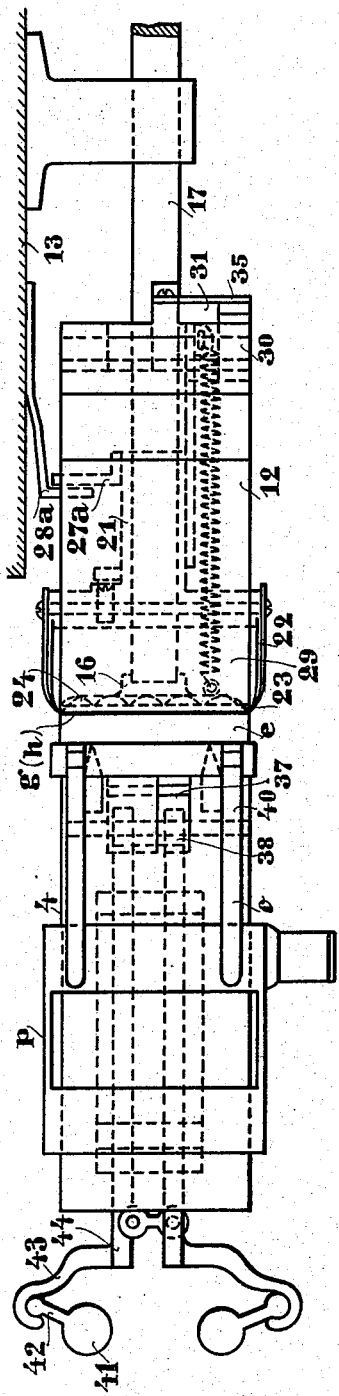

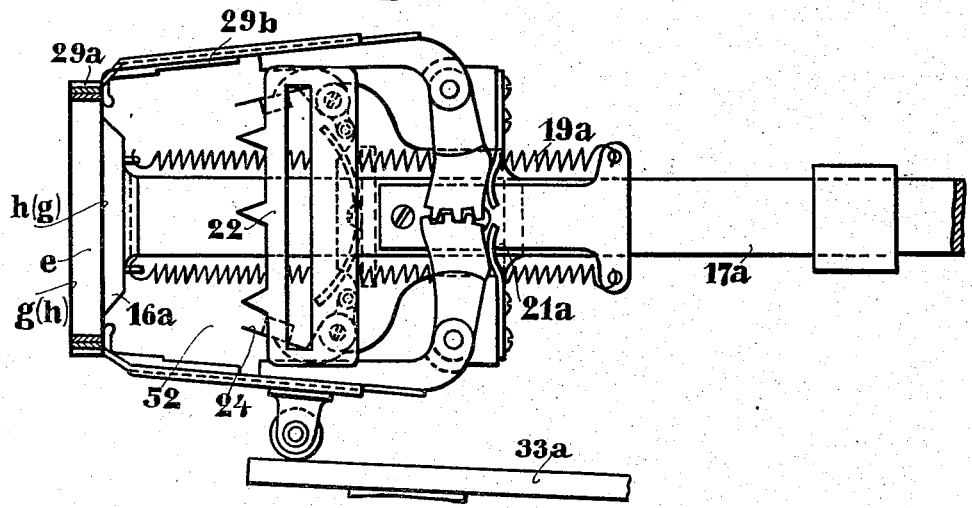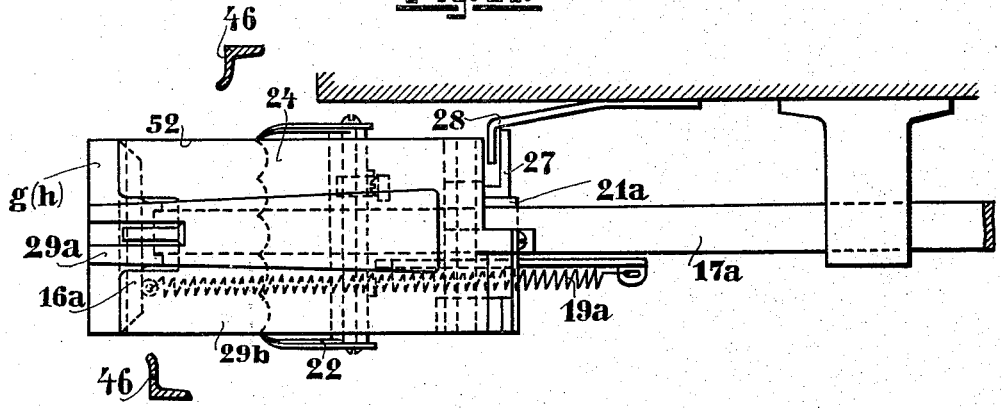

UNITED STATES PATENT OFFICE.

DAVID NYLANDER AND RICHARD HÖGFELDT, OF STRÖMSFORS, SWEDEN.

PAPER OR LIKE BOX MACHINE.

1,166,778.      Specification of Letters Patent.      Patented Jan. 4, 1916.

Application filed October 7, 1915. Serial No. 54,673.

*To all whom it may concern:*

Be it known that we, DAVID NYLANDER and RICHARD HÖGFELDT, subjects of the King of Sweden, residing at Strömsfors, Elfsborg, in the Kingdom of Sweden, have invented new and useful Improvements in Paper or like Box Machines, of which the following is a specification.

This invention refers to mechanical manufacturing of small angular boxes or cases of paper or similar material, especially such suited to be used for packing of cigarettes, pastils or the like.

The object of said invention is to employ a machine adapted to produce such boxes or cases complete in a single machine and in uninterrupted row so that the several parts, of which the boxes or cases are to be built up are introduced in the machine at the one end and continuously fed along, placed in the desired position to, and applied on each other and connected together so that the completed boxes or cases are discharged at the rear end of the machine ready for use without need of any further treatments than the application of some labels or the like, if wanted.

The sizes and shape of the boxes are arbitrary even if the sample shown in the accompanying drawings and described in this specification is exemplified as a rather thin and small square box. The general appearance of these boxes as well as their construction in details do not belong to this invention as they were well known long before, and we do not claim the exclusive right to them. The only limitation in this respect is to be found therein, that the boxes must be composed of two portions, the one forming the case proper and the other the cover, hinged thereto by aid of a paper strip. The case portion comprises sidewalls built up of double strips, the inner layer of a larger width than the outer layer, and a bottom sheet, fastened to the sidewalls by means of a joint strip. The cover portion comprises similar parts except of the side walls, which may be constructed of only a single layer. The main features we claim are such improvement in the machines for the manufacture of said class of boxes which makes it possible to carry out the complete work in a single machine, without need to remove the blanks from the one machine when merely partially ready and to place them in another machine for completing.

We are well aware of the fact that there will already be known several types of machines for producing boxes of the class referred to, but we do not know any such machine adapted to carry out this work in the same complete way as by our improved device.

One object of our said invention consists therein, that the single strips of which the shell of the boxes are to be composed, are jointed together in the same relative position as if they were treated by hand *e. g.* with overlap joints, whereby the boxes are given a much higher degree of rigidity and durability than what is usual in the generally known machine made paper boxes in which the strips forming the shell are usually connected with butt joints.

In the accompanying drawings the machine is illustrated in several views to clearly demonstrate its composition and working parts, and the box is shown in some schematical figures to illustrate its construction.

Figure 2:
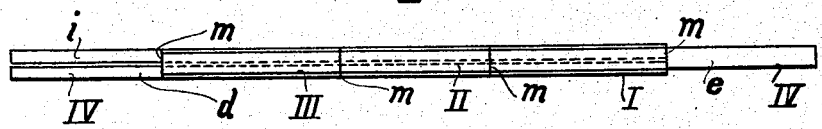
Figure 1:
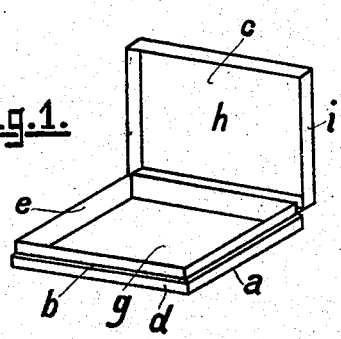
Figure 4:
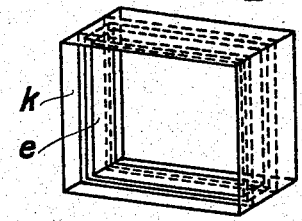

Figure 1 is a perspective view of the completed box with opened cover. Fig. 2 is a plan view of the three paperstrips of which the side walls of the box are built up, stretched out and placed in their proper relative position. Fig. 3 is an end view of said strips bent together into their intended shape. Fig. 4 is a perspective view of the boxwalls, surrounded by the joint strip and ready for inserting the bottom and cover sheets. Fig. 5 is a perspective view of the box completed with the exception of cutting through of the joint strip. Fig. 6 is a fragmentary side elevation of the machine with the front parts removed. Fig. 7 is a plan view of the machine with some parts broken off. Fig. 8 is a cross section on the line A—A in Fig. 7. Fig. 9 is a fragmentary view of the same cross section as in Fig. 8 with the working parts in another position. Fig. 10 is a fragmentary side view of the machine from the side opposite to Fig. 6. Fig. 11 is a fragmentary outer view of the front parts, removed in Fig. 6. Fig. 12 is a fragmentary side view partly in section of the devices for forming the side walls of the boxes. Fig. 13 the main portions of same view with the working parts in another position. Fig. 14 is in enlarged scale a side view of one of the implements for inserting the bottom or cover sheets. Fig. 15 is a plan view of the same detail as well as the mandrel for forming the box shell. Fig. 16 is a fragmentary side view of the same implement as in Fig. 14, partially in section, and showing the working parts in another position (the shell of the box is shown in section). Fig. 17 is a side view, partially in section of the same parts as in Fig. 15 with the devices in a third working position. Fig. 18 is (in a smaller scale) a vertical section of the mandrel in another working position as in Fig. 17. Fig. 19 is a fragmentary plan view of the feeding device for the side wall strips in another working position than in Fig. 7. Fig. 20 is a side view of the other implement for inserting the bottom (or cover) sheets, illustrated in its thrown out position, and Fig. 21 is a plan view of the same implement.

The box or case $a$ to be manufactured in this machine comprises as known a bottom portion $b$ and a hinged cover portion $c$. The first mentioned portion is composed by a narrow strip $d$ as the outer layer of the side walls and a strip $e$ of somewhat the double width as the inner layer of the same side walls, and a sheet $g$ as the bottom proper. The cover portion is composed by a sheet $h$ and a strip $i$ as side walls, the width of which nearly equals the difference in width between the broader and the narrower side wall strips $e$ and $d$ respectively, so that the strip $i$, when the box is closed, fills up the space between the outer edges of strip $e$ and strip $d$. The side wall strips $e$ and $d$ of the bottom portion are held together as well as to the sheet $g$ by means of a pasted joint strip $k$ and the same joint strip $k$ also keeps the side wall strip $i$ adhered to the sheet $h$. The strip $k$ is bent over all the corners of the box and at the rear side of the box it serves also in a known manner as a hinge for the cover.

The two narrower strips $d$, $i$, in a known manner provided with slits $m$ where they are to be bent, are stored each in a magazine 1, 2 (Fig. 6) in vertical lots situated close alongside each other and adapted to supply, the lot in magazine 2, the narrow strip layer $d$ for the bottom portion and the lot in magazine 1 the strip $i$ for the cover portion. A feeding implement 3 in the form of pliers movable to and fro in the lengthwise direction of the strips $d$, $i$ catches the two undermost strips (one in each magazine) and pulls them out close to each other until their portion marked with II (Fig. 2) has arrived beneath the elevated mandrel 4. The joint strip $k$, provided with paste in any suitable manner, not illustrated in the drawing, is fed along by means for pliers 5 from the opposite end of the machine until it arrives beneath the two strips $d$ and $i$ (Fig. 6). The broader strips $e$ are stored in a vertical lot in a magazine 6 at the side of that place, where strips $d$, $i$ meet the joint strip $k$ and the undermost strip $e$ is supplied by a lateral motion above the three strips $d$, $i$ and $k$ in the proper staggered position thereto (Fig. 2) by means of a pushing implement 7. The mandrel 4 now descends and at the same time a suitable length of the endless joint strip $k$ is cut off by means of shears 8. The mandrel reaches at first the three strips $e$, $d$ and $i$, pushes them down until they meet the joint strip $k$ and descends through two molding holes, the edges 9 and $9^a$ of which (Figs. 12, 13) force the strips to be bent in U shape around the three sides of the mandrel 4 with the portions IV corresponding to the fourth side of the box, remaining in an elevated position. The staggered position between strips $d$, $i$ on the one side and strip $e$ on the other causes the end of strip $e$ to be on the right hand of the mandrel (according to the drawing) and the ends of strips $d$, $i$ on the left hand. The upstanding end of the strip $e$ is now bent down against the upper side of the mandrel 4 by means of a bar 10 movable to and from the mandrel (Fig. 13) and after that the upstanding ends of strips $d$ and $i$ are bent down above the end of strip $e$ by means of a similar device 11. The mandrel 4 now continues its descending movement, which was interrupted for the short time necessary to accomplish the bending down of the strip ends, and when its top side has reached the level of the bending down devices $10^a$ and $11^a$ which are of similar type as the devices 10 and 11, the upstanding ends of the joint strip $k$ are pushed down in the following manner: The bending device $10^a$ moves ahead along a portion of the top side of the mandrel 4, pushing down a corresponding portion of the right hand end of strip $k$, after which it stops and returns a little toward its initial position; now the device $11^a$ comes in action, and bends down the left hand end of strip $k$ and returns to its original position whereafter the device $10^a$ again begins to move and bends down the outermost portion of the right hand end, which thus will be applied above the left hand end accomplishing a reliable lap joint for said strip $k$. When in its down position the mandrel 4 stands straight ahead of the implement 12, which has for its object to supply the bottom sheet $g$ to the now completed shell of the box, which still is suspended on the mandrel with the edges of the joint strip $k$ projecting out at the both sides of the shell (Fig. 4). The sheets $g$ are stored in a known manner in a magazine 13 at the side of the mandrel 4 and are pushed out laterally by a device 14 to the implement 12 where the sheet comes to rest toward a piston 16 (Fig. 14) which is moved ahead by a rod 17 reciprocated to and from the mandrel by suitable levers or the like (not shown in the drawing) actuating a pin 18 on the rod. The piston 16 is attached to a cross head 20 by means of springs 19 and the head 20 connected to a hub 21 movable longitudinally on the rod 17. The hub 21 is further provided with two side frames 22 with somewhat bent or inclined projecting teeth or tips 23 adapted to enter as a wedge in the space between the projecting edges of the strip $k$ when the implement 12 is moved ahead toward the mandrel 4, by which said edges are forced out a little allowing the sheet $g$ to be inserted without disturbing the strip $k$ until it reaches its proper place, $e. g.$ close to edge of bottom side walls $d$, $e$. Movable plates 24 hinged to the hub 21 above and beneath the sheet $g$ on pivots 25 and actuated by a spring 26 which tends to swing the plates 24 inward, serve the same purpose. The free passage into the space formed by the projecting edges of strip $k$ which is accomplished by the plates 24 and sideframes 22 is somewhat narrower in the vertical direction than the width of the sheet $g$ which as a consequence is caused to be bent a little when forced through by means of piston 16 (Fig. 16) thus allowing its easy insertion between the edges of the strip $k$, whereas without this measure it would be rather impossible to get the sheet safe in place on account of the very thin and soft appearance of said edges.

The hub 21 follows the ahead movement of the rod 17 by means of the spring 19 until the points of the plates 24 and frames 22 almost touch the edges of the box shell $d$, $e$. At this moment a stopper $27^a$ projecting from the hub 21 is caught by a stopper $28^a$ fastened on the sidewall of the magazine 13 (Fig. 15) thus preventing the hub from moving farther ahead. As the rod 17 still continues its motion the tension of spring 19 is exceeded, and the rod 17 is moved ahead in relation to the hub 21, so that the piston 16 with sheet $g$ is pushed out between the passage formed by plates 24 and frames 22 into its place at the box shell $d$, $e$ (Figs. 21 and 22).

Flaps 29 hinged by means of pivots 30 on arms 31 projecting from the rod 17 are actuated by coöperating toothed segments 32 in such a way, that they are caused to swing always in the same degree and at the same time. The lower flap 29 rests by means of an antifriction roller $32^a$ on an up and down movable rail 33 actuated by a link 34, and the toothed segments 32 are actuated by a spring 35 in such a manner, that the inwardly flanged ends 36 of the flaps 29 are swung outward, away from contact with the box shell. The rail 33 is actuated by the link 34 in such a way that it raises the lower flap 29 and, through the toothed segments 32, causes the upper flap to descend as soon as the sheet $g$ has been inserted in place by the piston rod 17; this swinging of the flaps causes their inwardly flanged ends 36 to bend the projecting upper and lower edges of the strip $k$ down toward the outside of the sheet $g$, fixing same to the rods backward. (Figs. 15 and 17).

The sidewalls of the box are retained on the mandrel 4 during the applying of the sheet $g$ by means of swinging arms 37 (Fig. 18) pivoted on pins 40 and actuated from oscillating vertical rods 41 by means of projecting arms 42, coöperating with reciprocating hooked rods 38 which mesh with the bulb shaped inner ends 39 of the swinging arms 37. As soon as the sheet $g$ is in position the arms 37 are swung upward by the aid of springs 45 which push the hooked rods backward. (Figs. 15 and 17).

The two vertical edges of the joint strip $k$ are bent over toward the back of the sheet $g$ by means of pivoted jaws 46 (Figs. 6 and 7) actuated by a link 47 and toothed segments 48 in such a manner, that the jaws are clapped together toward the projecting vertical edges of strip $k$ as soon as the implement 12, having completed its beforementioned work on the sheet $g$, is removed from the mandrel 4. A spring 49 reopens the jaws 46 and the jaws, which are hinged on a block 50 can be moved somewhat backward off the mandrel 4 in a guide 51 thereby removing the now half done box from the mandrel 4. The guide 51 with the block 50, and jaws 46 after that can move laterally (parallel to the length of the strips $d$, $i$, $e$) until the jaws 46 with the half done box arrive in front of another implement 52 for inserting the cover sheet $h$ which implement is practically equivalent to the before mentioned implement 12. As soon as the jaws 46 have removed the box from the mandrel 4 the latter is free to rise to the upper position, where it commences again the descending motion for forming the next sample of box shell.

The removing of the half done box from the mandrel 4 takes place in the following manner: As soon as the sheet $g$ by the inward motion of the flaps 29 has been attached to the box shell by the bending down of the pasted joint strip $k$ the implement 12 is suddenly drawn back by the action of the spring 19, thereby the piston 16 reaches the end of hub 21 and, when continuing its back motion, causes the hub to move rearward until the implement 12 is out of reach of the mandrel 4. Now the jaws 46 are clamped together around the box shell on the mandrel 4, bending down the vertical edges of the strip $k$ as mentioned before and catching the box, which by means of push rods $o$ on a movable frame $p$ (Figs. 15 and 17) on the mandrel 4 is forced off the mandrel at the same time as the jaws 46 are moved rearward in the guide 51.

The cover sheets $h$ are stored in a magazine 53 of the same appearance as the magazine 13 and are fed over to the implement 52 in the same manner as above described with regard to the bottom sheets g. The implement 52 and its mode of working for applying the cover sheet to the box shell meet in every detail the above description of the implement 12 with the only difference in the method of retaining the box when bending down the edges of the joint strip k as well as the bending down of the vertical edges of said strips. The implement 52 (Figs. 20 and 21) is at the upper and lower sides provided with elastic grippers 29$^a$ which are pressed toward the upper and lower sidewalls of the box shell at the same time as the flaps 29$^b$ are swung inward to bend down the joint strip edges, and by this motion the grippers 29$^a$ seize the box and retain it, while the jaws 46 open and release the same. At this moment the implement 52 is already pushed as far ahead as the implement 12 when inserting the sheet g, e. g. so that the points of the frames 22 and plates 24 stand merely on a distance equal to the thickness of sheet h from the edge of the box shell, in which position the stopper 27 of the rod 17$^a$ coöperates with the stopper 28 on the wall of the magazine 53, so that the further movement of the member 21$^a$ is prevented and the pushing out of the piston 16$^a$ accomplished, applying the cover sheet h between the edges of the joint strip k. The horizontal edges of strip k are bent down by the flaps 29$^b$, the piston 16$^a$, flaps 29$^b$ and grippers 29$^a$ with the box are pushed farther forward and pass between the fully opened jaws 46 until the box arrives at the entrance of the channel or guide 54. This is provided with bending devices for bending down the vertical edges of strip k, which devices in all essentials are equivalent to the jaws 46—except that they are nonmovable in relation to the channel 54—and therefore are not shown in the drawing in order not to entangle the figures. Now the rail 33$^a$ descends, the grippers 29$^a$ release the box and the implement 52 is quickly removed by the aid of spring 19$^a$.

The strip k must be cut through on three sides to allow the opening of the cover, leaving the fourth side uncut to serve as the hinge for the cover. This is accomplished in a known manner by three rotatable cutters or circular knives 57, 58, 59 of which the first mentioned cuts through the one side, while the box is caused to pass this knife in the channel 55 branched upward from the rear end of the channel 54. The channel branch 55 continues in a third channel or guide 57$^a$ and during the passage through this guide the knife 58 is passed cutting through the second side of the strip k, and after that the knife 59, which cuts the third side of the strip. In this way the thin side walls of the box are protected from being injured by the action of the knives. As this cutting through of the strip k is well known, the corresponding devices as well as their mode of working is not clearer described nor illustrated in order not to entangle the drawings.

As the pliers 3 cannot grasp the strips d, i before their ends are brought outside the wall 60 of the magazines 1, 2, we employ a rod 61 which constitutes the bottom proper of the magazines and on the left side (in Fig. 6) is provided with a butt 62 and actuated by a small double armed lever 63 (Fig. 19). During the right hand movement of the pliers 3 the one arm of lever 63 is caught by a stopper 64, and at the same time the opposite arm 65 comes in contact with the end of the rod 61. The non-interrupted movement of pliers 3 causes the non-movable stopper 64 to swing the lever 63 so that the arm 65 pushes the rod 61 to the right, thereby causing its butt 62 to push the undermost strip in each magazine 1, 2 somewhat to the right, far enough to allow their right ends to depart off the wall 60 in position to be grasped by the pliers 3 when removed to the innermost (=left) position. The left hand movement of the pliers 3 causes the right end 66 of the rod 61 to be caught by the pliers and thus to remove the rod 61 back to its original position. The stroke of the rod 61 is regulated by a set screw 67 which coöperates with the wall 68 of the magazines 1, 2 during the rear motion of the rod 61. To protect the lever 63 from breakage, if the said regulating of the stroke should be false, the stopper 64 ought to be somewhat elastic as illustrated in Fig. 6.

Having thus described our said invention and how the same is to be performed, what we claim and want to protect by Letters Patent is:

1. In a machine for manufacturing boxes of paper or similar material comprising a mandrel for forming the side walls of the box, means for bending the strips of which the side walls are to be built up around said mandrel, means for surrounding said side wall strips with a joint strip, means for inserting the bottom and cover sheets into the shell inside the projecting edges of said joint strip, means for bending down said joint strip toward the bottom and cover sheets, and means for cutting through three sides of said joint strip leaving the fourth side uncut to serve as a hinge for the cover.

2. In a machine for manufacturing paper boxes comprising an up and down reciprocating mandrel for forming the side walls of the box, magazines for storing the strips to form the side walls, reciprocating pliers to feed the strips in position to be caught by the mandrel when descending, molding edges through which the mandrel descends, thereby causing said strips to be bent along three sides of the mandrel, means to bend down on to the mandrel the fourth side of the side walls, means for inserting the bottom and cover sheets, means for fastening said sheets to the shell by a joint strip and means to cut through the joint strip on three sides.

3. In a machine for manufacturing paper boxes comprising an up and down reciprocating mandrel for forming the side walls of the box, means for bending the strips to form the side walls around three sides of the mandrel, reciprocating pushers adapted to bend down the strip on to the fourth side of the mandrel, means for inserting the bottom and cover sheets and for attaching them to the shell by means of a joint strip and means to cut through said joint strip.

4. In a machine for manufacturing paper boxes comprising an up and down reciprocating mandrel for forming the side walls of the box, means for bending down the strips for the side walls around the mandrel, means for surrounding the shell with a joint strip, means for inserting the bottom and cover sheets between the projecting edges of the joint strip, means to expand said edges to allow sufficient clearance for the inserting of said sheets, means for bending down on to the rear side of said sheets the horizontal edges of said joint strip, means for bending down on to the same rear sides the vertical edges of the joint strip, and means for cutting through said joint strip.

5. In a machine for manufacturing paper boxes comprising an up and down reciprocating mandrel for forming the side walls of the box, means for bending the side wall strips around said mandrel, means for surrounding the shell with a joint strip, means for inserting the bottom and cover sheets between the projecting edges of said joint strip, means to expand said projecting edges of the joint strip to facilitate the inserting of the sheets, means to slightly bend the sheets when they pass the expanded strip ends, to prevent the injuring thereof, means to fasten the bottom and cover sheets by bending down the projecting edges of the joint strip on to the rear sides of the sheets and means to cut through the joint strip.

6. In a machine for manufacturing paper boxes comprising an up and down reciprocating mandrel for forming the side walls of the box, means for forming the shell, means for applying the bottom and cover sheets, means to remove the shell from the mandrel, means to remove the half done box off from the device for inserting the bottom sheet and to place it in front of the device for inserting the cover sheet and means for cutting through the joint strip.

In testimony whereof we have hereunto set our hands in presence of two subscribing witnesses.

DAVID NYLANDER.
RICHARD HÖGFELDT.

Witnesses:
 GUSTAV SETH,
 ADOLF MOLM.

Copies of this patent may be obtained for five cents each, by addressing the "Commissioner of Patents, Washington, D. C."